US008789056B2

(12) United States Patent
Cragun et al.

(10) Patent No.: US 8,789,056 B2
(45) **Date of Patent: *Jul. 22, 2014**

(54) AUTOMATICALLY GENERATING COMPOUND COMMANDS IN A COMPUTER SYSTEM

(71) Applicant: International Business Machines Corporation, Armonk, NY (US)

(72) Inventors: Brian J. Cragun, Rochester, MN (US); David G. Herbeck, Rochester, MN (US); Todd E. Johnson, Chatfield, MN (US); John E. Petri, St. Charles, MN (US); Leah R. Smutzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,040

(22) Filed: Feb. 19, 2013

(65) Prior Publication Data

US 2013/0160015 A1 Jun. 20, 2013

Related U.S. Application Data

(63) Continuation of application No. 12/557,581, filed on Sep. 11, 2009, now Pat. No. 8,539,487.

(51) Int. Cl.

| | |
|---|---|
| ***G06F 9/46*** | (2006.01) |
| ***G06F 17/00*** | (2006.01) |
| ***G06N 5/00*** | (2006.01) |
| ***G06N 5/02*** | (2006.01) |
| ***G06N 7/00*** | (2006.01) |
| ***G06N 7/02*** | (2006.01) |
| ***G06N 5/04*** | (2006.01) |
| ***G06F 15/18*** | (2006.01) |

(52) U.S. Cl.
USPC .............. 718/100; 718/102; 706/45; 706/46; 706/47; 706/48; 706/50; 706/59; 706/60; 706/61

(58) Field of Classification Search
None
See application file for complete search history.

(56) References Cited

U.S. PATENT DOCUMENTS

| | | | |
|---|---|---|---|
| 5,548,703 | A | 8/1996 | Berry et al. |
| 5,659,676 | A | 8/1997 | Redpath |
| 5,809,267 | A | 9/1998 | Moran et al. |
| 6,173,339 | B1 | 1/2001 | Yorimitsu |
| 6,247,066 | B1 | 6/2001 | Tanaka |
| 6,404,438 | B1 | 6/2002 | Hatlelid et al. |

(Continued)

*Primary Examiner* — Charles Swift

(74) *Attorney, Agent, or Firm* — Martin & Associates, LLC; Derek P. Martin

(57) ABSTRACT

A computer system provides a way to automatically generate compound commands that perform tasks made up of multiple simple commands. A compound command generation mechanism monitors consecutive user commands and compares the consecutive commands a user has taken to a command sequence identification policy. If the user's consecutive commands satisfy the command sequence identification policy the user's consecutive commands become a command sequence. If the command sequence satisfies the compound command policy, the compound generation mechanism can generate a compound command for the command sequence automatically or prompt an administrator to allow the compound command to be generated. Generating a compound command can be done on a user by user basis or on a system wide basis. The compound command can then be displayed to the user to execute so that the command sequence is performed by the user selecting the compound command for execution.

6 Claims, 14 Drawing Sheets

(56) References Cited

U.S. PATENT DOCUMENTS

| | | | |
|---|---|---|---|
| 2004/0117513 | A1 | 6/2004 | Scott |
| 2007/0156747 | A1 | 7/2007 | Samuelson |
| 2007/0239713 | A1 | 10/2007 | Leblang et al. |
| 2009/0083698 | A1 | 3/2009 | Jarrett et al. |
| 2009/0138805 | A1 | 5/2009 | Hildreth |
| 2009/0319504 | A1 | 12/2009 | Alberth et al. |
| 2010/0198768 | A1 | 8/2010 | Zhou et al. |
| 2011/0131513 | A1 | 6/2011 | Yamamoto |

900

| Context | Criteria |
|---|---|
| My Work Area | <Condition operator “OR”><br><Condition type “timeBetweenCommands” operator “LT”><br><Value val “20”/><br></Condition><br><Condition type “commonEntityType” operator “EQ”><br><Value val “Document”/><br></Condition><br></Condition> |
| My Tasks | <Condition type “timeBetweenCommands” operator “LT”><br><Value val “15”/><br></Condition> |
| Search | <Condition operator “OR”><br><Condition type “timeBetweenCommands” operator “LT”><br><Value val “20”/><br></Condition><br><Condition type “explicitInstruction” operator “EQ”><br><Value val “search_context”/><br></Condition><br></Condition> |

Compound Command Criteria

```
<Contexts>
  <Context name="My Work Area" scope="user">
    <Condition type="occurances" operator="GT">
      <Value val="5"/>
    </Condition>
  </Context>
  <Context name="My Tasks" scope="enterprise">
    <Condition operator="OR">
      <Condition type="occurances" operator="GT">
        <Value val="5"/>
      </Condition>
      <Condition type="global_percent_use" operator="GE">
        <Value val="75"/>
      </Condition>
  </Context>
  <Context name="Search" scope="role">
      <Condition type="role_percent_use" operator="GE">
        <Value val="75"/>
      </Condition>
  </Context>
</Contexts>
```

Automatically Generate Compound Commands?

```
<Condition operator "OR">
  <Condition type "Context">
    <Value val "My Work Area"/>
  </Condition>
  <Condition type "Context">
    <Value val "My Tasks"/>
  </Condition>
</Condition>
```

Notify Administrator?

```
<Condition operator "OR">
  <Condition type "Context">
    <Value val "My Work Area"/>
  </Condition>
  <Condition type "Context">
    <Value val "My Tasks"/>
  </Condition>
  <Condition type "Context">
    <Value val "Search"/>
  </Condition>
</Condition>
```

| | Command | Timestamp | Entity Type | Annotations |
|---|---|---|---|---|
| 1305 | View XML Document | 11:23:12 | Document | None |
| | Checkin | 11:25:10 | Document | None |
| 1310 | Change Attributes | 11:25:15 | Document | None |
| | Send for review | 11:25:24 | Document | None |
| | Set Printers | 11:25:48 | Document | None |
| | Set Viewers | 11:26:58 | Document | None |
| | Set Printers | 11:27:06 | Document | None |
| | Set Notification List | 11:27:12 | Document | None |
| | Issue | 11:27:26 | Document | None |
| | Make Effective | 11:27:31 | Document | None |
| | Checkin | 11:29:01 | Document | None |
| 1320 | Change Attributes | 11:29:15 | Document | None |
| | Send for review | 11:29:34 | Document | None |
| | Print | 11:31:29 | Document | None |
| | Checkin | 11:34:15 | Document | None |
| 1330 | Change Attributes | 11:34:31 | Document | None |
| | Send for review | 11:34:42 | Document | None |
| | View XML Document | 11:38:18 | Document | None |
| | Checkin | 11:42:51 | Document | None |
| 1340 | Send for review | 11:43:06 | Document | None |
| | Make Effective | 11:43:22 | Document | None |
| | Checkin | 11:48:36 | Document | None |
| 1350 | Change Attributes | 11:48:39 | Document | None |
| | Send for review | 11:48:52 | Document | None |
| | Print | 11:51:00 | Document | None |
| | Checkin | 11:51:30 | Document | None |
| 1360 | Change Attributes | 11:51:49 | Document | None |
| | Send for review | 11:52:01 | Document | None |
| | View XML Document | 11:54:59 | Document | None |
| | Checkin | 11:55:42 | Document | None |
| 1370 | Change Attributes | 11:55:54 | Document | None |
| | Send for review | 11:56:01 | Document | None |
| | Print | 11:59:16 | Document | None |

| Context | Command Combination | Number of Occurrences by User | |
|---|---|---|---|
| My Work Area 1410 | Make Changes and Send for Review<br>1. Checkin<br>2. Change Attributes<br>3. Send for Review | Joe | 7 |
| | | Nancy | 3 |
| | | Mike | 10 |
| | | Sally | 6 |
| My Work Area 1420 | Configure and View XML Document<br>1. Set XML Configuration Set<br>2. View XML Document | Joe | 6 |
| | | Nancy | 3 |
| | | Mike | 2 |
| | | Sally | 0 |
| My Tasks 1430 | Make Document Effective<br>1. Set Viewers<br>2. Set Printers<br>3. Set Notification List<br>4. Issue<br>5. Make Effective | Joe | 10 |
| | | Nancy | 0 |
| | | Mike | 7 |
| | | Sally | 11 |
| | | | |

| | Context | Compound Commands | Scope of Compound Commands |
|---|---|---|---|
| 1510 | My Work Area | Make Changes and Send for Review | User[Joe], user[Mike], user[Sally] |
| 1520 | My Work Area | Configure and View XML Document | User[Joe] |
| 1530 | My Tasks | Make Document Effective | Enterprise |

| Context | Command Combination | Number of Occurrences by User | |
|---|---|---|---|
| My Work Area 2010 | View and Make Changes and Send for Review 1. View XML Data 2. Make Changes and Send for Review | Joe | 5 |
| | | Nancy | 1 |
| | | Mike | 3 |
| | | Sally | 2 |

| | Context | Compound Commands | Scope of Compound Commands |
|---|---|---|---|
| 2110 → | My Work Area | View and Make Changes and Send for Review | User[Joe] |

FIG. 21

AUTOMATICALLY GENERATING COMPOUND COMMANDS IN A COMPUTER SYSTEM

BACKGROUND

1. Technical Field

This disclosure generally relates to computer systems, and more specifically relates to commands in a computer system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the system. If a rule is satisfied, the CMS may perform subsequent processing on the content. Known content management systems may include rules related to bursting, linking, and synchronization. Bursting rules govern how a document is bursted, or broken into individual chunks, when the document is imported or checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

In known content management systems, a user can choose to execute any of a number of simple commands. Users often perform tasks composed of multiple simple commands. These tasks can be repeated a number of times in a single day. Users must repeatedly select the same simple commands to perform a certain task. While performing a task with one or two steps may be inconvenient, when tasks are composed of many simple commands, repeating steps to accomplish a task wastes a lot of the user's time. Without a way to automatically create compound commands based on how a user actually uses the system, users will continue to waste time by having to select the same sequence of simple commands to perform a task.

BRIEF SUMMARY

A computer system provides a way to automatically generate compound commands that perform tasks containing more than one simple command. A compound command generation mechanism monitors consecutive user commands and compares the consecutive commands a user has performed to a command sequence identification policy. If the user's consecutive commands satisfy the command sequence identification policy, the user's consecutive commands become a command sequence. If the command sequence satisfies the compound command policy, the compound generation mechanism can generate a compound command for the command sequence automatically or prompt an administrator to allow the compound command to be generated. Generating a compound command can be done on a user by user basis or on a system-wide basis. The compound command can then be displayed to the user to execute so the command sequence is performed automatically when the user selects to execute the compound command.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 9 shows a sample command sequence identification policy;

FIGS. 10-12 show portions of a sample compound command policy;

FIG. 13 shows a sample user command log;

FIG. 14 shows sample command sequence occurrence data;

FIG. 15 shows sample compound command data;

FIG. 20 shows sample command sequence occurrence data that comprises a single command and a compound command; and FIG. 21 shows a sample compound command that comprises a single command and a compound command.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

The content management system disclosed herein provides a way to automatically generate compound commands by monitoring a user's commands. If the user's consecutive commands satisfy a command sequence identification policy, then the commands are an appropriate command sequence. The command sequence is then checked against a compound command policy that determines whether or not a compound command should be created for the command sequence. The compound command can then be displayed to users who also satisfy the compound command policy.

Figure 1:
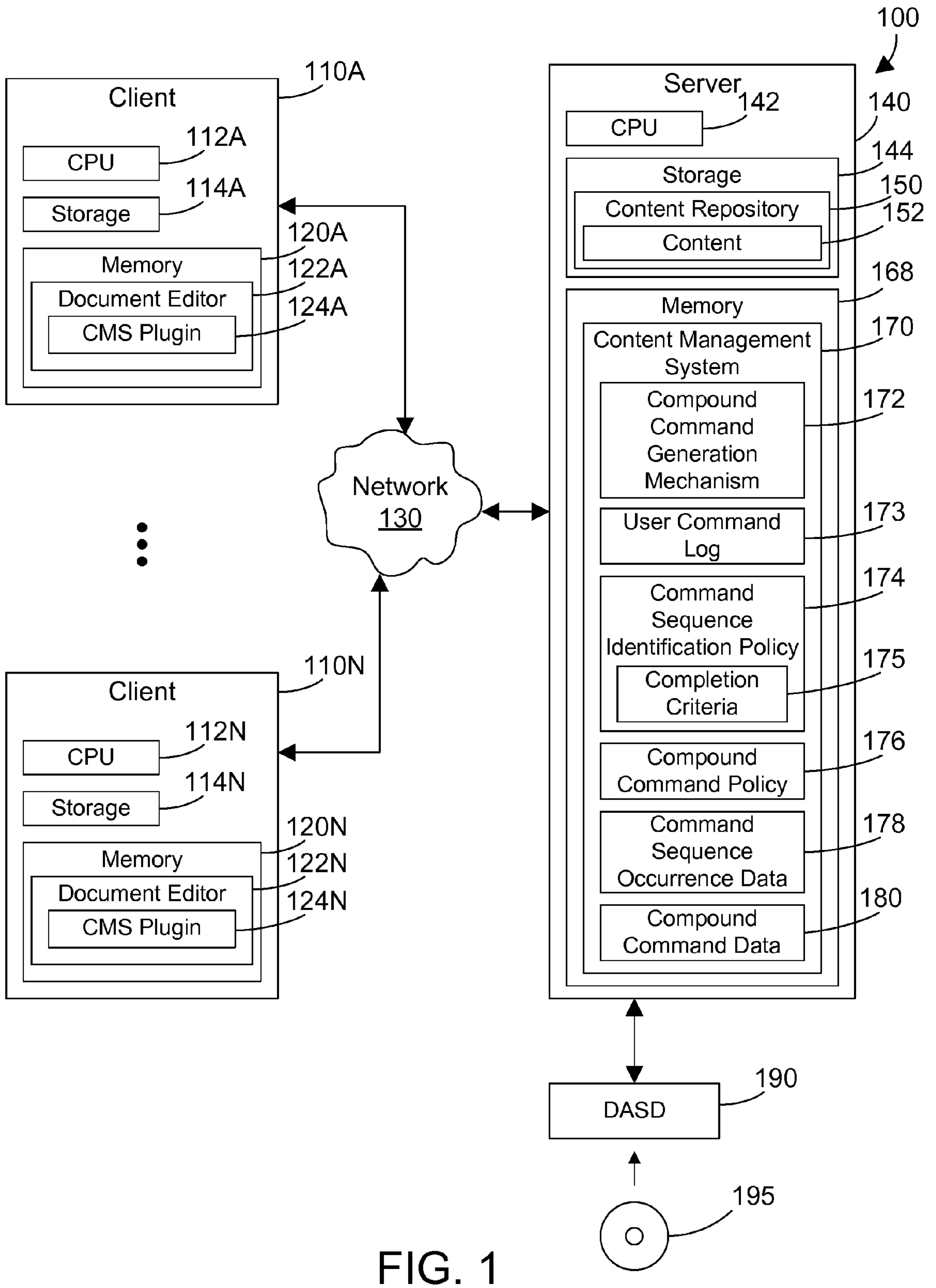
FIG. 1 is a block diagram of a networked computer system that includes a server computer system that has a content management system that includes a compound command generation mechanism that automatically identifies appropriate command sequences and generates compound commands for those command sequences.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 168 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a compound command generation mechanism 172, a user command log 173, a command sequence identification policy 174 that contains completion criteria 175, a compound command policy 176, command sequence occurrence data 178, and compound command data 180.

Compound command generation mechanism 172 monitors a user's commands and stores the commands in user command log 173. While user command log 173 is shown herein as part of content management system 170, the disclosure and claims herein are not limited to user command log 173 being located in the content management system. User command log 173 could equally be located in memory 168, content repository 150, or remotely in network 130. The disclosure and claims expressly extend to any location of user command log 173.

If the user's consecutive commands satisfy command sequence identification policy 174, then the user's command sequence is identified as a command sequence. Command sequence identification policy 174 contains completion criteria 175 that determines when a command sequence is completed. Command sequence identification policy 174 can be defined in a number of different ways. One suitable implementation contains a time period where, once the user performs a command, a timer is started, and as long as the user performs another command before the timer expires, the command sequence continues until the user does not perform a command within the time period. The time period could be static or floating. A static time period would reset upon each command performed by the user. Thus a command sequence under a static time period would start with a first command performed by the user. A timer would start, and if the user performs a second command before the timer expires, the second command would become part of the command sequence. The timer would be reset and the user would have another time period to perform a command. When the user does not perform a command before the timer expires, the command sequence is complete. Thus completion criteria 175 in this implementation would be the timer expiring before the user performs another command. The command sequence occurrence is stored in command sequence occurrence data 178 and is checked against compound command policy 176 to see if a compound command should be created. A command sequence under a floating time period would be defined by some constant time period (i.e. 20 seconds). Thus a command sequence would be all consecutive commands performed by the user in the last time period (i.e. 20 seconds).

Another suitable way to define command sequence identification policy 174 would be in terms of a common entity type. A command sequence could be defined to be all consecutive commands performed by the user on a common entity type. For example, if three consecutive commands are performed in succession on a "document" entity, the three commands would be a command sequence. Another suitable implementation to define command sequence identification policy 174 would be in terms of common commands. A command sequence would be a number of the same command. For example, if three consecutive documents are printed, the command sequence would be printing the three consecutive documents. Yet another suitable implementation to define command sequence identification policy 174 would be in terms of explicit instructions. Explicit instructions would provide a way for an administrator to define certain commands that are not related, but that still should be considered as a possible command sequence. For example, an administrator could designate that every command in a command sequence must have a certain annotation, thus the command sequence would be the consecutive commands that have the annotation.

Command sequence identification policy 174 could also be defined according to a user's context or role. For example, an administrator could have a different set of criteria in command sequence identification policy 174 than a regular user. Additionally, command sequence identification policy 174 could have different criteria depending on the context where the user is operating (i.e. "My Work Area" or "Search"). The separations in criteria could be contained in a single command sequence identification policy 174, or each context or role could have its own corresponding command sequence identification policy. Command sequence identification policy 174 could additionally contain a threshold that specifies a minimum number of commands each command sequence must contain.

Completion criteria 175 can be defined explicitly or implicitly. Completion criteria 175 is defined explicitly when there is a certain event that triggers completion of a command sequence (i.e. a timer expiring). Completion criteria 175 is defined implicitly when a certain situation implies that a command sequence is complete (i.e. floating time period). Thus, completion criteria 175 is simply any way to specify when a command sequence is complete.

Compound command policy 176 can define one or more thresholds that determine when a compound command should be generated for a command sequence. For example, compound command policy 176 could define a number of times the command sequence would need to occur before a compound command is generated. Compound command policy 176 could also include whether or not to notify an administrator that a compound command has been generated, and it could also specify whether or not the compound command should be automatically generated. One suitable implementation would be to have different thresholds for each user context. Another suitable implementation would be to have a single threshold that applies to all command sequences. While compound command policy 176 will be discussed as comprising a threshold of a number of times a command sequence must occur, the disclosure and claims extend to any threshold or heuristic used to determine when a compound command should be generated for a command sequence.

Command sequence occurrence data 178 stores the number of occurrences of each command sequence. One suitable implementation stores the number of occurrences of each command sequence by user. Another suitable implementation stores the number of occurrences of each command sequence globally. Command sequence occurrence data 178 can include a name for the command sequence, the steps in the command sequence, or a corresponding context. Compound command data 180 is one step of generality away from command sequence occurrence data 178. Compound command data 180 contains a name of a compound command, a corresponding context, and the users who can use the compound command. Compound command data 180 makes it so compound command generation mechanism 172 does not have to check each user against compound command policy 176 every time a compound command might need to be displayed.

As used in the disclosure and claims herein, the term "document" means any type of data that may be managed by a content management system, including all known types of data and objects as well as those developed in the future, and the term "element" means any section or portion of a document. As used in the disclosure and claims herein, the term "command sequence" means any suitable sequence of consecutive commands performed by the user. A command sequence can consist of simple commands, compound commands, or a combination of simple and compound commands, and one suitable implementation has a corresponding context for the command sequence. As used in the disclosure and claims herein, the term "compound command" means any command that automatically executes more than one simple command, a combination of simple command and compound commands, or more than one compound command. As used in the disclosure and claims herein, the term "simple command" is an individual command normally available to a user.

While compound command generation mechanism 172 is shown in FIG. 1 as part of content management system 170 on server computer system 140, one skilled in the art will appreciate that one or more of the features of the compound command generation mechanism 172 could be implemented within a CMS plugin within a document editor on a client computer system, such as within CMS plugin 124A shown in FIG. 1. The disclosure and claims herein expressly extend to any suitable way to allocate different functions between a client and the server that hosts the content management system to achieve a dynamic inclusion mechanism.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
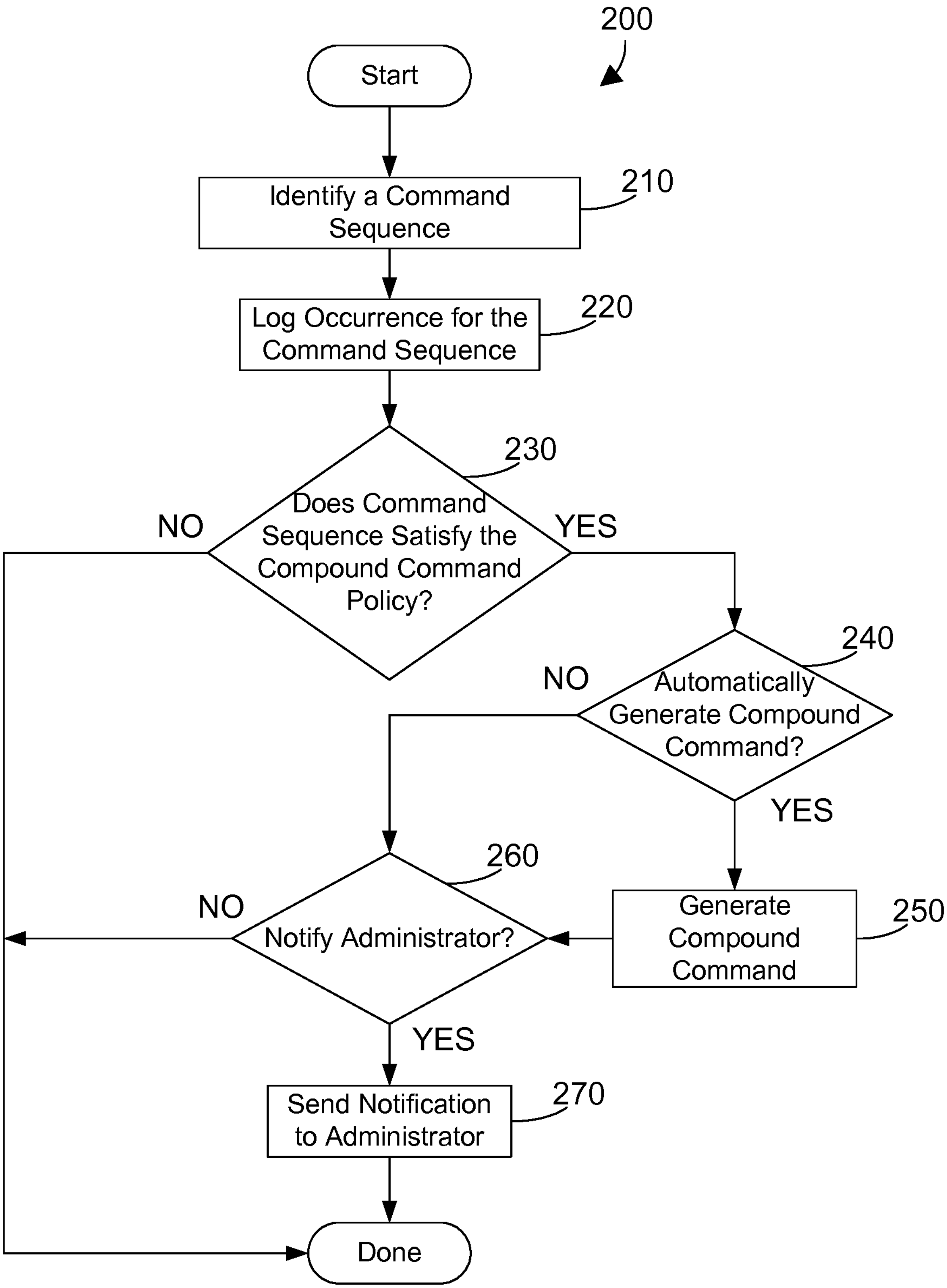
FIG. 2 is a flow diagram of a method for generating a compound command.
Figure 3:
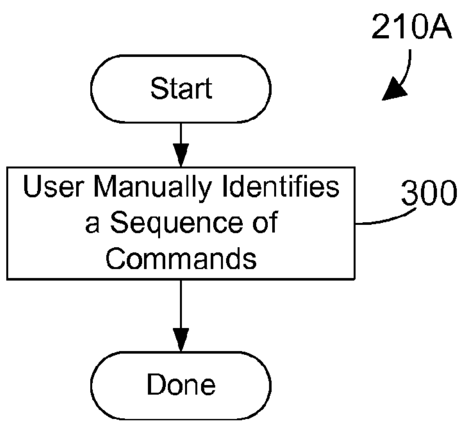
FIG. 3 is a flow diagram of a method for manually identifying an appropriate command sequence.
Figure 4:
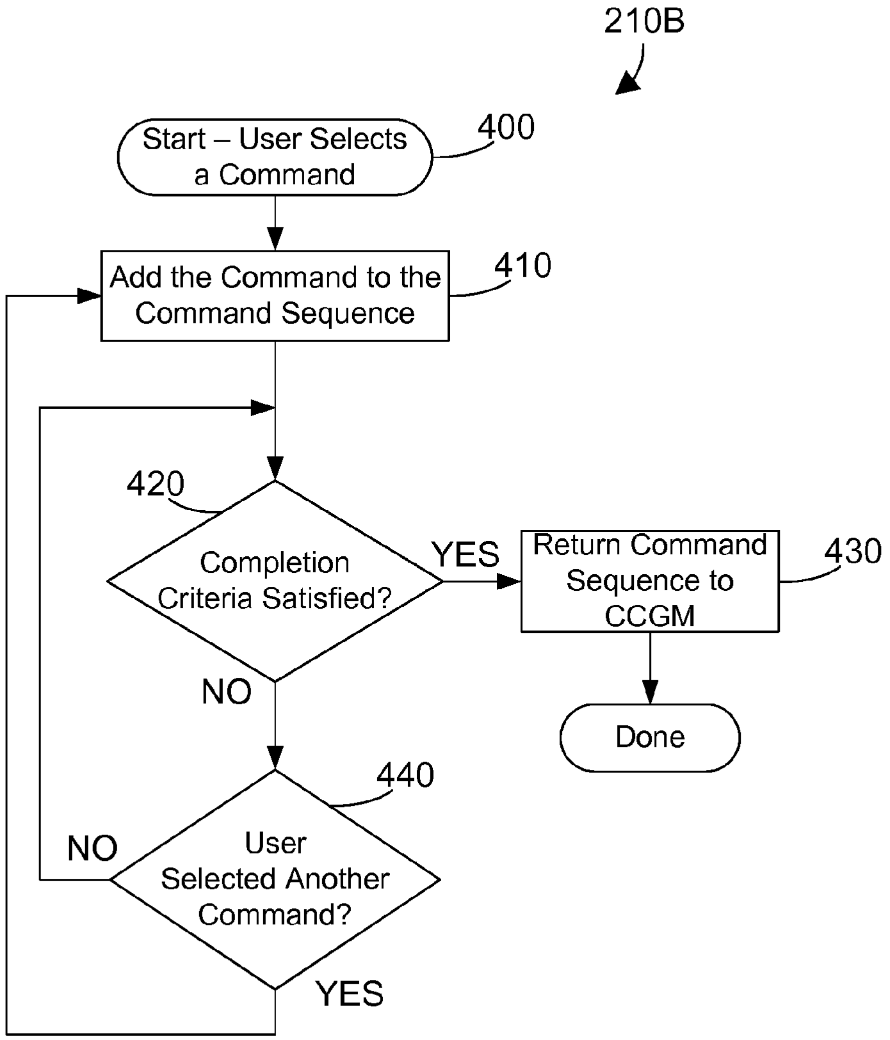
FIG. 4 is a flow diagram of a method for automatically identifying an appropriate command sequence.
Figure 6:
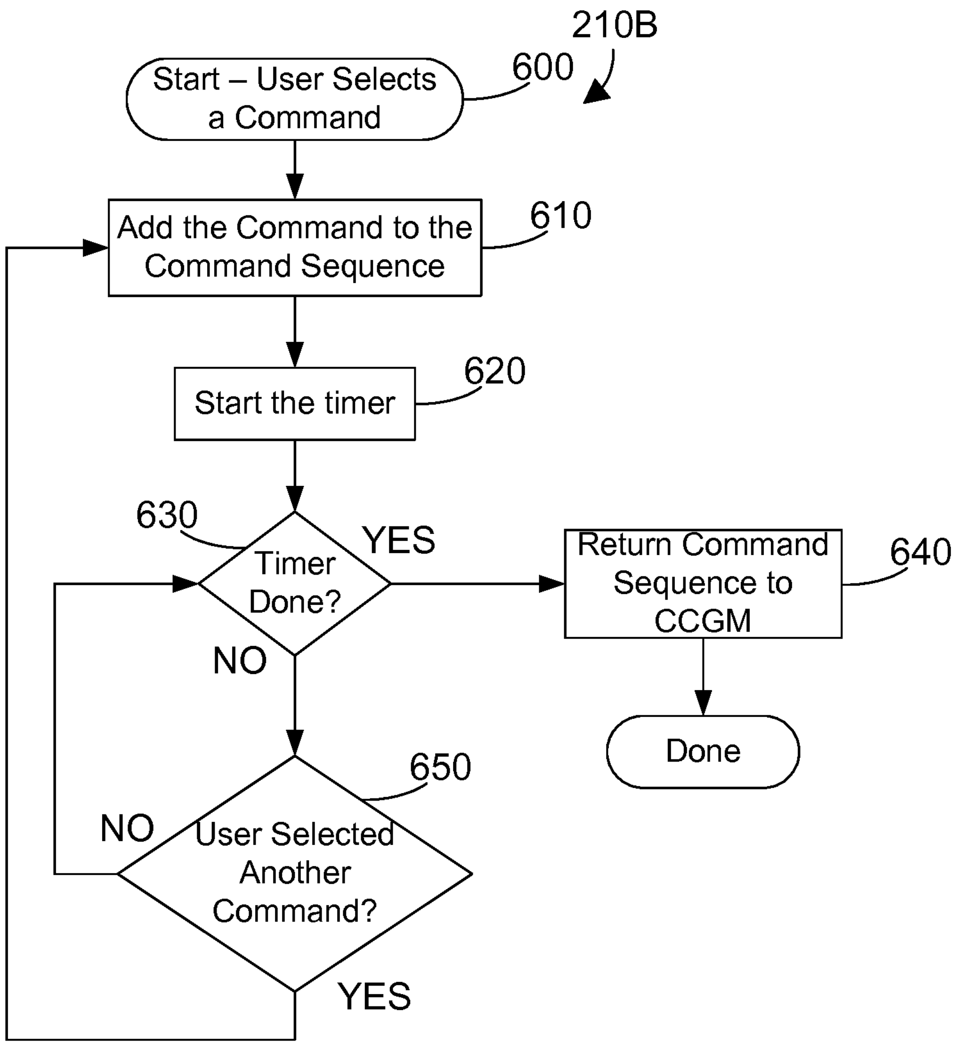
FIG. 6 is a flow diagram of a method for one suitable implementation for method 210B in FIG. 4 to identify a command sequence.

Referring to FIG. 2, a method 200 is preferably performed by the compound command generation mechanism 172 in FIG. 1, and begins when a command sequence is identified (step 210). Note as discussed above, a command sequence is identified according to command sequence identification policy 174 which can be defined in a number of ways, as described above. Three specific suitable examples for ways to identify a command sequence are shown in FIGS. 3-4 and FIG. 6. Once a proper command sequence is identified, an occurrence of the command sequence is logged (step 220). If the command sequence does not satisfy compound command policy 176 (step 230=NO), then method 200 is done. If the command sequence satisfies compound command policy 176 (step 230=YES), method 200 moves to step 240. If compound command policy 176 designates that the compound command should be automatically created (step 240=YES), then the compound command is created (step 250). If compound command policy 176 designates that the administrator should be notified (step 260=YES), then a notification is sent to the administrator (step 270), and method 200 is done. If compound command policy 176 designates the administrator should not be notified (step 260=NO), then method 200 is done. If compound command policy 176 designates that the compound command should not be automatically created (step 240=NO), then method 200 moves to step 260. If compound command policy 176 designates that the administrator should be notified (step 260=YES), then a notification is sent to the administrator (step 270), and method 200 is done. If compound command policy 176 designates the administrator should not be notified (step 260=NO), then method 200 is done.

Referring to FIG. 3, a method 210A shows one suitable implementation for step 210 in method 200 in FIG. 2. Method 210A in FIG. 3 allows a user to manually identify a command sequence (step 300) and method 210A is done. The user could identify a command sequence in a variety of ways. One suitable implementation would be a drag-and-drop interface where a user could drag selected commands into an ordered command sequence. Another suitable implementation would be manual programming that would define the command sequence. The disclosure and claims herein extend to any way for a user to manually define a command sequence whether currently known or developed in the future.

Referring to FIG. 4, a method 210B shows another suitable implementation for step 210 in method 200 in FIG. 2. Method 210B in FIG. 4 automatically identifies a command sequence during normal operation by a user according to command sequence identification policy 174, and begins when a user selects a command (step 400). The command is added to the command sequence (step 410). If completion criteria 175 is not satisfied (step 420=NO), then method 210B moves to step 440. If the user has selected another command (step 440=YES), then the command is added to the command sequence (step 410). If the user has not selected another command (step 440=NO), method 210B returns to step 420. If the completion criteria is satisfied (step 420=YES), then the command sequence is complete and is returned to compound command generation mechanism 172 (step 430) and method 210B is done. Command sequence identification policy 174 can be defined in a number of ways, as described above. For the specific examples herein, command sequence identification policy 174 is defined in terms of a static time period, where a command sequence comprises all of the commands with less than the threshold of time between each command.

Figure 5:
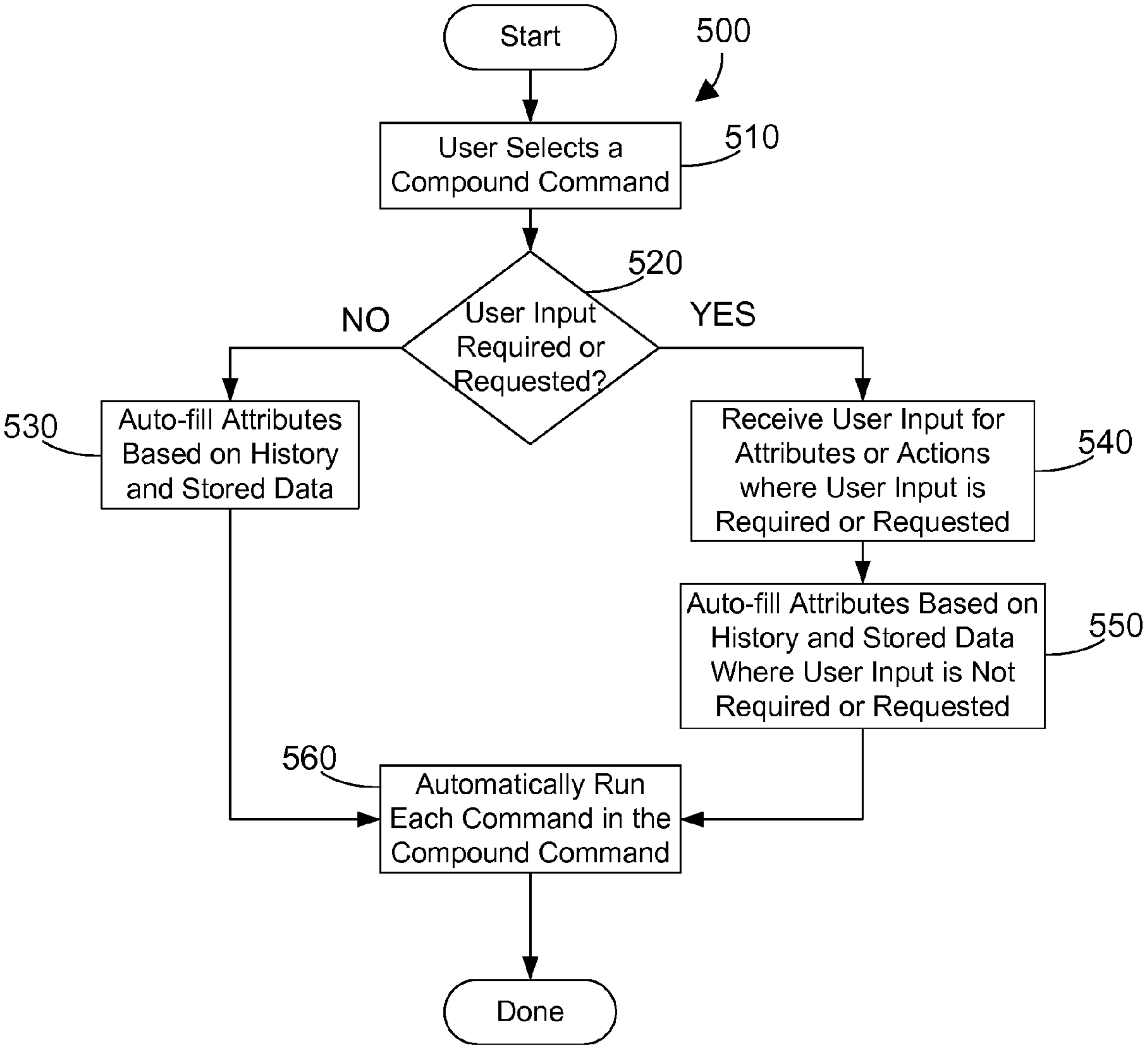
FIG. 5 is a flow diagram of a method for running a compound command.

Referring to FIG. 5, a method 500 for executing a compound command begins by a user selecting a compound command to execute (step 510). If user input is not required or requested for any step in the compound command, (step 520=NO), then the attributes and data needed for the steps in the compound command are automatically filled based on system history for executing those steps and stored data (step 530). Each command in the compound command is then automatically run (step 560), and method 500 is done. If user input is required or requested for any step in the compound command, (step 520=YES), then user input is received for the attributes or commands where the user input was required or requested (step 540) and the attributes and data needed for the other commands is filled based on system history and stored data (step 550). Each command in the compound command is then automatically run (step 560), and method 500 is done. Note that steps 540 and 550 can be performed in either order if the user wants to manually input all user input. Another suitable implementation would be for step 550 to be performed and auto fill the attributes and data based on history and stored data and then allow the user to modify the data that needs modifying (step 540).

Referring to FIG. 6, a method 210B shows one suitable implementation for step 210B in FIG. 4, which begins by a user selecting a command (step 600). The selected command is then added to the command sequence (step 610). A timer is started (step 620). If the timer is not done (step 630=NO), then method 600 moves to step 640. If the user has selected another command (step 650=YES), then method 600 returns to step 610. If the user has not selected another command (step 650=NO), method 600 returns to step 630. If the timer is done (step 630=YES), then the command sequence is complete and returned to the compound command generation mechanism (step 640) and method 600 is done.

Figure 7:
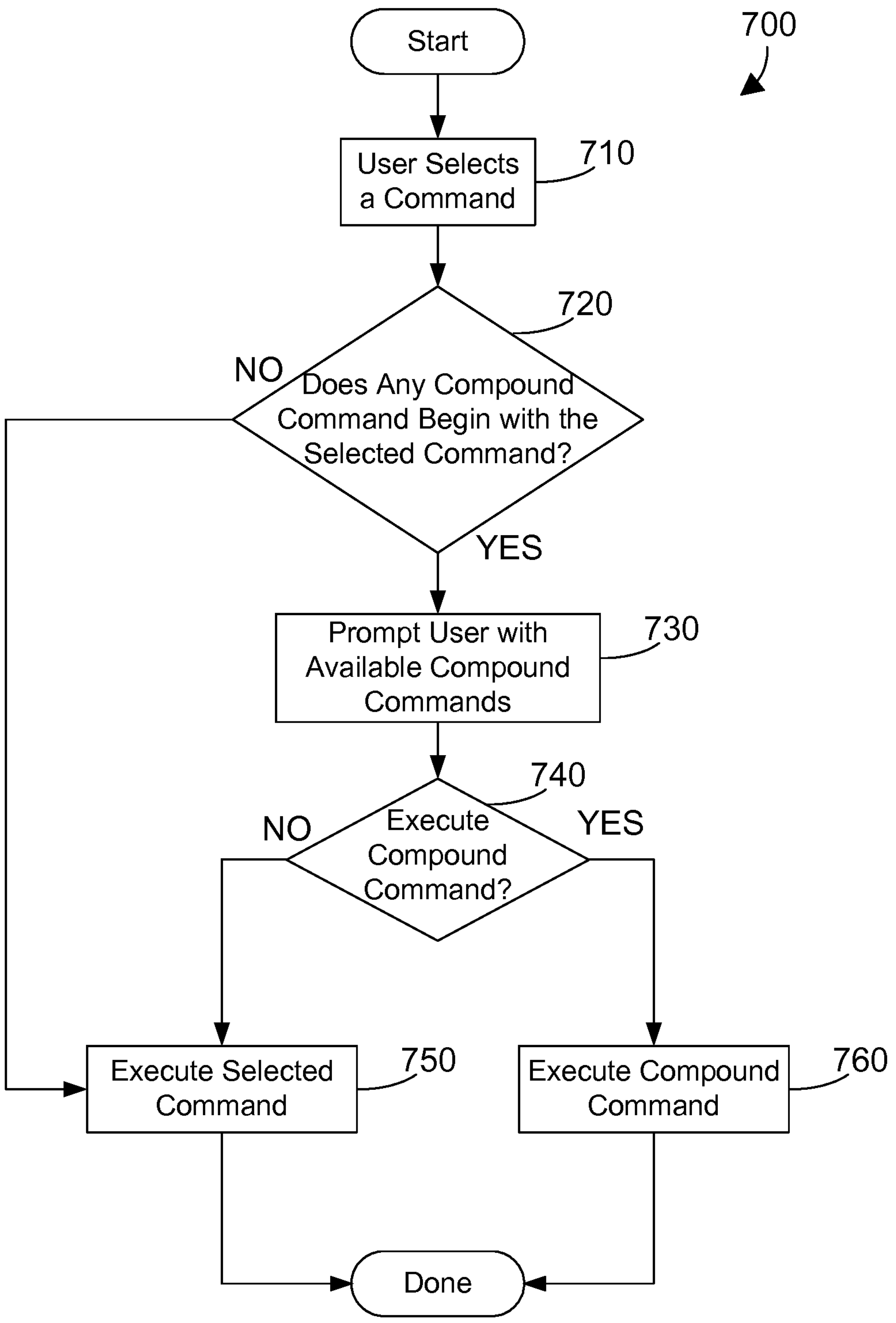
FIG. 7 is a flow diagram of a method for one suitable implementation for displaying compound commands to a user.

One suitable implementation for displaying compound commands to a user is shown as method 700 in FIG. 7. A user selects a command (step 710). If there are no compound commands that begin with the selected command (step 720=NO), then the selected command is executed (step 750) and method 700 is done. If there is at least one compound command that begins with the selected command (step 720=YES), then the user is prompted with the available compound commands that start with the selected command and asked if the user wants to run one of the compound commands rather than the selected command (step 730). If the user wants to run a compound command (step 740=YES), then the compound command is executed (step 760), and method 700 is done. If the user does not want to run the compound command (step 740=NO), then the selected command is executed (step 750), and method 700 is done.

In step 730 in FIG. 7, the user could be prompted in a number of ways. One implementation would be to have a popup menu or box that showed the user which compound command(s) began with the selected command and ask if the user wanted to perform any of the listed compound commands. Another implementation would allow the user to set a flag that would automatically execute the first compound command that started with the selected command. Yet another implementation presents the user with a drop down menu of the available compound commands that began with the selected command. A still further implementation would display to a user a list of potential compound commands before the user selects any simple command. For example, the CMS could determine a list of available compound commands based on the user's current context (e.g., the user's work area). The disclosure and claims herein extend to any way to prompt the user with one or more compound commands that begin with the selected command.

Figure 8:
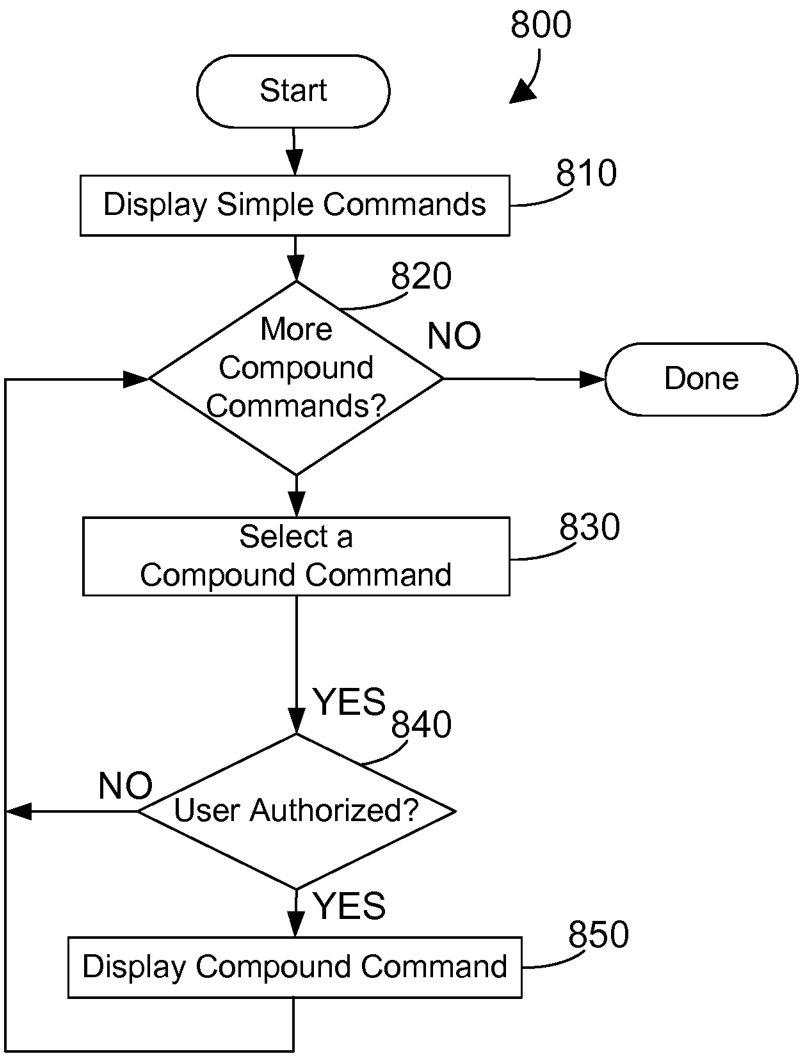
FIG. 8 is a flow diagram of a method for a second suitable implementation for displaying compound commands to a user.

Referring to FIG. 8, a method 800 for displaying compound commands to a user starts by displaying simple commands to the user (step 810). If there are more compound commands to be analyzed (step 820=YES), one of the remaining compound commands is selected (step 830). If the user is authorized in compound command policy 176 for the selected command (step 840=NO), method 800 returns to step 820. If the user is not authorized in compound command policy 176 for the selected compound command (step 840=YES), then the compound command is displayed to the user (step 850), and method 800 returns to step 820. When there are no remaining compound commands to process (step 820=NO), method 800 is done. Thus method 800 will display all compound commands to a user that the user is authorized to access.

A simple example is now provided to illustrate many of the concepts described above. FIG. 9 shows a sample command sequence identification policy 900 for the example herein. Command sequence identification policy 900 contains separate criteria depending on the context the user is operating in. Criteria for "My Work Area" context in command sequence identification policy 900 shows that a command sequence is defined to be consecutive commands that occur with less than 20 seconds between commands, or if the user's consecutive commands are operating on a common entity (i.e. document), all consecutive commands performed on the common entity. Criteria for "My Tasks" context in command sequence identification policy 900 shows that a command sequence is defined to be consecutive commands that occur with less than 15 seconds between commands. Criteria for "Search" context in command sequence identification policy 900 shows that a command sequence is defined to be consecutive commands that occur with less than 20 seconds between commands or whenever the explicit instruction equals "search context".

FIGS. 10-12 show a sample compound command policy 176 for the example herein. To simplify the example, we will assume only four users: Joe, Nancy, Mike, and Sally. Each of the four users is in a normal user role. Compound command policy 176 contains criteria, and may optionally contain different data or settings. Note that compound command policy 176 for this specific example includes criteria 1000 in FIG. 10, 1100 in FIG. 11 and 1200 in FIG. 12. While compound command policy 176 is shown in three separate pieces in this specific example, compound command policy 176 can be whole or separated into separate pieces. Compound command criteria 1000 specifies conditions that must be met for a command sequence to become a compound command. Compound command criteria 1000 contains different criteria depending on the context the user is operating in. For example, compound command criteria 1000 contains the threshold that when the user is in the "My Work Area" context, the command sequence must have occurred more than five times for the compound command to be created. In the "My Tasks" context, the command sequence must have occurred more than five times, or the command sequence must have occurred for at least 75 percent of the users in the system. In the "Search" context, the command sequence must have occurred for at least 75 percent of the users in the system. It is also important to note that compound command criteria 1000 contains a scope for each context. Thus the "My Work Area" context has the scope of "user" meaning that for a compound command to be generated in the "My Work Area" context, a user must perform the command sequence more than five times. The "My Tasks" context has the scope of "enterprise" meaning that for a compound command to be generated in the "My Tasks" context, the enterprise (i.e. the whole network of users) must have performed the command sequence more than five times collectively, or greater than 75 percent of the users have performed the command sequence. The scope allows compound command policy to have compound command criteria defined for multiple scopes in the same context.

Compound command flag 1100 specifies whether a compound command should automatically be generated for a command sequence that satisfies compound command criteria 1000. Thus compound command flag 1100 designates automatic generation of compound commands for those command sequences in the "My Work Area" and "My Tasks" context, but not for command sequences in the "Search" context. Administrator notification flag 1200 specifies whether an administrator should be notified when a command sequence satisfies the criteria in compound command policy 176. Administrator notification flag 1200 specifies that a network administrator should be notified in the "My Work Area", "My Tasks", and "Search" contexts. While FIGS. 11 and 12 show a global flag for each context, it is equally possible to define a compound command flag and an administrator notification flag based upon context and a user scope or role. Each of these flags could be contained within compound command policy 176 or could be separate elements.

FIG. 13 shows a sample user command log 1300 for the example herein, which corresponds to user command log 173 in FIG. 1. User command log 1300 is the stored list of logged commands made by user Joe as user Joe worked in the system. Notice that each entry in user command log 1300 contains a timestamp, an entity type, and annotations for explicit instructions. This allows for user command log 1300 to be recorded once and to be analyzed by compound command generation mechanism 172 a number of times in a number of ways depending on how command sequence identification policy 174 is defined. As user Joe was operating in the "My Work Area" context, command sequences 1310-1370 occurred. We will walk through command sequence 1310 to illustrate the principles discussed herein. At 11:29:01, user Joe performed the command "Checkin" (step 600 in FIG. 6). "Checkin" is added to the command sequence, and is the first command in the command sequence (step 610 in FIG. 6). A timer is started (step 620). User Joe performed the command "Change Attributes" at 11:29:15, fourteen seconds after performing "Checkin" (step 630=NO and step 650=YES in FIG. 6). As a result, command "Change Attributes" is added to the command sequence (step 610). A timer is started (step 620). User Joe performed the command "Send for Review" at 11:29:34, nineteen seconds after performing "Change Attributes" (step 630=NO and step 650=YES). As a result, command "Send for Review" is added to the command sequence (step 610). A timer is started (step 620). User Joe performed the command "Print" at 11:31:29, one minute and fifty-five seconds after performing "Send for Review" (step 630=YES). As a result, the command sequence is finished, and the command sequence is returned to compound command generation mechanism (step 640). Notice the command sequence is command sequence 1410 in FIG. 14. An occurrence for the command sequence is recorded in command sequence occurrence data 178 (step 220 in FIG. 2; shown in command sequence occurrence data 1400 in FIG. 14), and the number of occurrence for Joe will be set to one because this is the first time in this specific example Joe performed this sequence of commands. Since Joe has not performed this command sequence the threshold number of times defined in compound command policy 176 (i.e. five occurrences), no compound command is created (step 230=NO in FIG. 2). Note the logging of occurrences of command sequences may be done in a single log for all users, in multiple logs for subsets of users, or may be done in separate logs for each user.

We note that Joe repeats the sequence in 1310 five more times, in sequences 1320, 1330, 1350, 1360 and 1370. Once the command sequence 1410 has been identified (step 210 in FIG. 2), the occurrence of command sequence 1410 is recorded in command sequence occurrence data 1400 (step 220 in FIG. 2). The fifth time the command sequence 1410 occurs the fifth time in sequence 1360, the number of occurrences is above the threshold (step 230=YES in FIG. 2). Since automatically generate compound command flag 1100 is true for "My Work Area" context (step 240=YES in FIG. 2), the compound command is generated (step 250 in FIG. 2), resulting in compound command 1510 shown in FIG. 15. Note that the scope of compound command 1510 includes user Joe as a user that can utilize compound command 1510. The other user's input and further input by user Joe are not shown herein, but result in command occurrence data 1400 and compound command data 1500 shown in FIGS. 14 and 15.

FIG. 14 shows a specific sample 1400 for command sequence occurrence data 178 in FIG. 1. As each of the four users work in the system, compound command generation mechanism 172 logs occurrences of command sequences that satisfy command sequence identification policy 174 in command sequence occurrence data 1400. As the four users have used the system, command sequence occurrence data 1400 shown in FIG. 14 contains two command sequences 1410 and 1420 in the "My Work Area" context and one command sequence 1430 in the "My Tasks" context. Command sequence occurrence data 1400 contains a command combination column which gives a name to the command sequence and lists the commands that comprise the command sequence. Command sequence occurrence data 1400 also contains the number of occurrences of each command sequence for each user. For example, command sequence 1410 in the "My Work Area" context was performed seven times by Joe, three times by Nancy, ten times by Mike, and six times by Sally. Command sequence 1420 in the "My Work Area" context was performed six times by Joe, three times by Nancy, two times by Mike, and zero times by Sally. Command sequence 1430 in the "My Tasks" context was performed ten times by Joe, zero times by Nancy, seven times by Mike, and eleven times by Sally.

The discussion herein revolves around a command sequence being "performed" by a user. This is simply an easier way to say that the commands comprising the command sequence in question are executed in sequence. For example, Joe "performing" command sequence 1410 one time means that in the course of Joe using the system, Joe checked a document in (step 600 in FIG. 6). Checking a document in then becomes the first command in the command sequence (step 610 in FIG. 6). Within 20 seconds of checking the document in (step 630=NO), Joe changed some attributes in the document (step 650=YES in FIG. 6). Changing attributes in the document is added to the command sequence (step 610 in FIG. 6). Within 20 seconds of changing some attributes in the document (step 630=NO), Joe sent the document for review (step 650=YES). Sending the document for review is added to the command sequence (step 610 in FIG. 6), and since Joe did not perform any commands within 20 seconds of sending the document for review (step 630=YES), the command sequence is complete and sent to the compound command generation mechanism (step 640 in FIG. 6). Since the command sequence identification policy has been satisfied, an occurrence of the command sequence is logged in command sequence occurrence data 1400 (step 220 in FIG. 2). For Joe to "perform" the command sequence again he would simply repeat the steps above. Thus Joe repeated the above steps seven times, as shown in the command sequence occurrence data 1400 in FIG. 14.

One suitable implementation for adding command sequences to command sequence occurrence data is to add every command sequence that every user performs to command sequence occurrence data. Another suitable implementation is to only add a command sequence to command sequence occurrence data if one user satisfies compound command policy 176 (i.e. at least one user has performed the command sequence more than the threshold of times). Yet another suitable implementation is to only add a command sequence to command sequence occurrence data if the command sequence contains above a threshold number of commands. For example, a threshold of three could be specified, which would cause sequences of two commands not to be stored as compound commands.

Compound command generation mechanism 172 takes the data in command sequence occurrence data 178 and generates therefrom compound command data 180. Compound command data maps compound commands that have been created with the various scopes and users that can use the compound commands based upon satisfying compound command policy 176. For the example herein, compound command policy 1000 in FIG. 10 states that in the "My Work Area" context, the scope of the compound command is on a user by user basis. Thus each user must satisfy compound command policy 1000 for the compound command to be created for that user. For the example herein, each user must have performed the command sequence more than five times to satisfy compound command policy 1000. In the example herein, users Joe, Mike, and Sally satisfy compound command policy 1000 for command sequence 1410. Thus Joe, Mike, and Sally are the users allowed to use compound command 1510, as shown in FIG. 15. Joe is the only user that satisfies compound command policy 1000 for command sequence 1420, and is shown as the only user within the scope of compound command 1520. Command sequence 1430 differs in context from command sequences 1410 and 1420, thus the applicable compound command policy is different. Command sequence 1430 is in the "My Tasks" context. Compound command policy 1000 requires more than five occurrences or 75 percent of the users performing the command sequence. Thus since Joe, Mike, and Sally have performed command sequence 1430, 75 percent of the users have performed the command, and the compound command is available for the entire enterprise (i.e. whole network of users). Thus the scope for compound command 1530 in FIG. 15 is "enterprise" meaning that the compound command will be available to every user, even if the user did not previously perform the command sequence.

Figure 16:
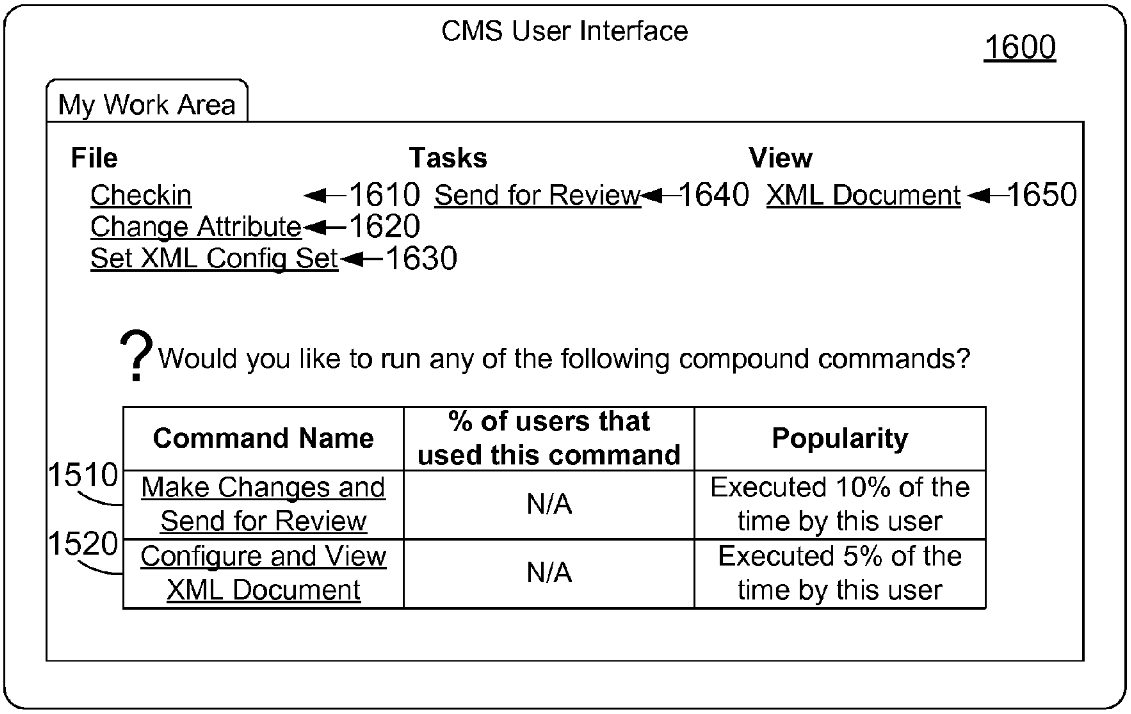
FIG. 16 shows a user interface for a first user in a first workspace for an example herein.

Referring to FIG. 16, user interface 1600 shows a sample user interface to illustrate the features discussed above. User interface 1600 is the user interface user Joe would see when using the CMS. User Joe is operating in the "My Work Area" context which includes simple commands 1610-1650. Simple commands 1610-1650 are always displayed to the user (step 810 in FIG. 8). Since user Joe meets the threshold (i.e. greater than 5 occurrences) in compound command policy 1000 for compound commands 1510 and 1520 (step 830=YES in FIG. 8), compound commands 1510 and 1520 are displayed to user Joe in user interface 1600. Compound commands 1510 and 1520 in user interface 1600 also have corresponding additional information available to the user. Compound commands 1510 and 1520 contain a "% of users who have run this command" field and a "Popularity" field. Since the scope of "My Work Area" is user based, the "% of users who have run this command" field is not applicable. The "Popularity" field shows how often the current user (i.e. Joe) has executed each of the compound commands.

Figure 17:
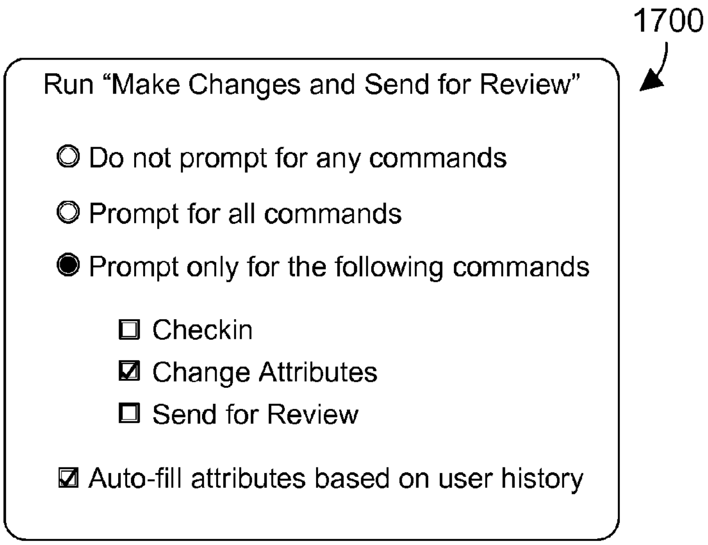
FIG. 17 shows a menu for a user to execute a compound command.

For the example herein, Joe selects compound command 1510 in FIG. 16 (step 510 in FIG. 5). Once the user selects compound command 1510, screen 1700 in FIG. 17 is shown to the user so the user can choose to be prompted at any, all, or none of the steps in the compound command (step 520=YES in FIG. 5). Note screen 1700 has the radio button "Prompt only for the following commands" selected and step "Change Attributes" has a checkmark to only prompt for the "Change Attributes" step in compound command 1510. Note that screen 1700 also includes an "Auto-fill attributes based on user history" box which, when selected, fills the attributes in each step based on user history. In the case of our current example, the attributes will be auto-filled (step 550 in FIG. 5), and then presented to the user for review during the "Change Attributes" step (step 540 in FIG. 5). The user can then change the attributes as needed. One implementation would have the attributes immediately displayed that the user could change or verify, so that when the compound command begins running it does not require any additional input from the user. Another implementation would execute the "Checkin" command, prompt the user with the auto filled attributes, the user would change the attributes, and then the "Send for Review" command would be immediately executed (step 560 in FIG. 5).

Figure 18:
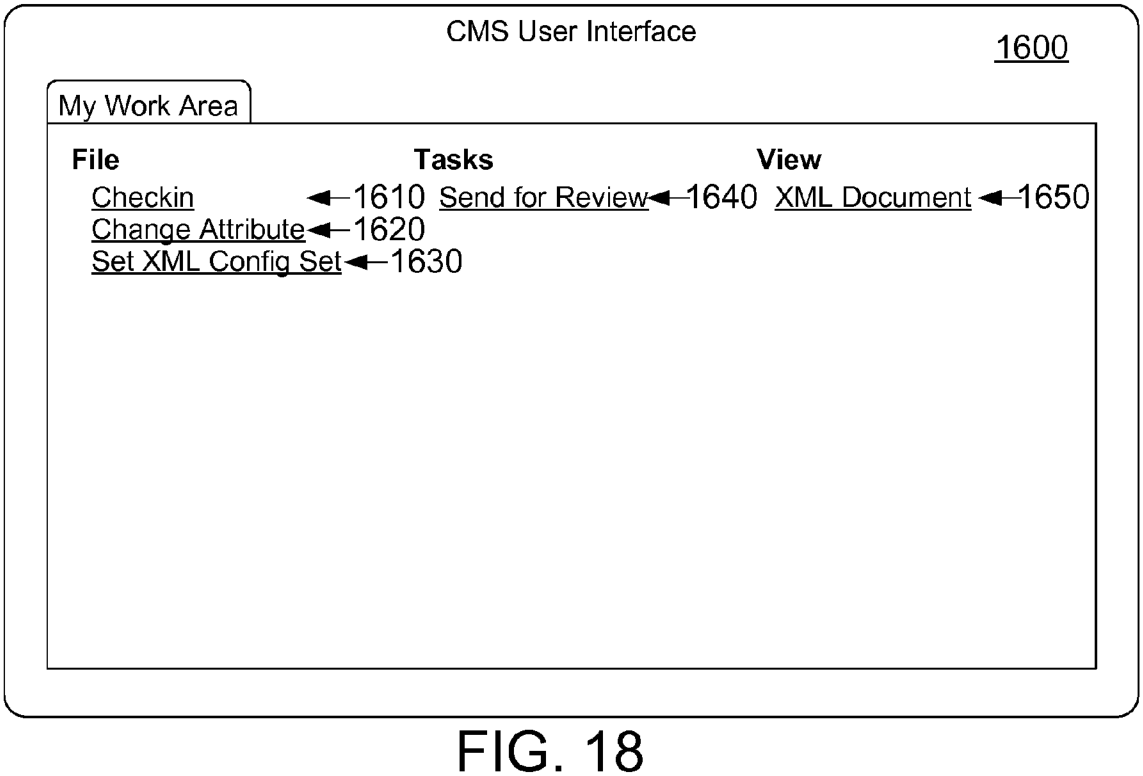
FIG. 18 shows a user interface for a second user in the first workspace for an example herein.

FIG. 18 shows a user interface 1800 for user Nancy in the example herein. In user interface 1800, user Nancy is operating in the "My Work Area" context which includes simple commands 1610-1650. Those simple commands are always displayed to the user (step 810 in FIG. 8). Since user Nancy does not meet the threshold for any of the compound commands in the "My Work Area" context (step 830=NO in FIG. 8), no compound commands are displayed to the user. Thus in the "My Work Area" context, Nancy only has the simple commands available.

Figure 19:
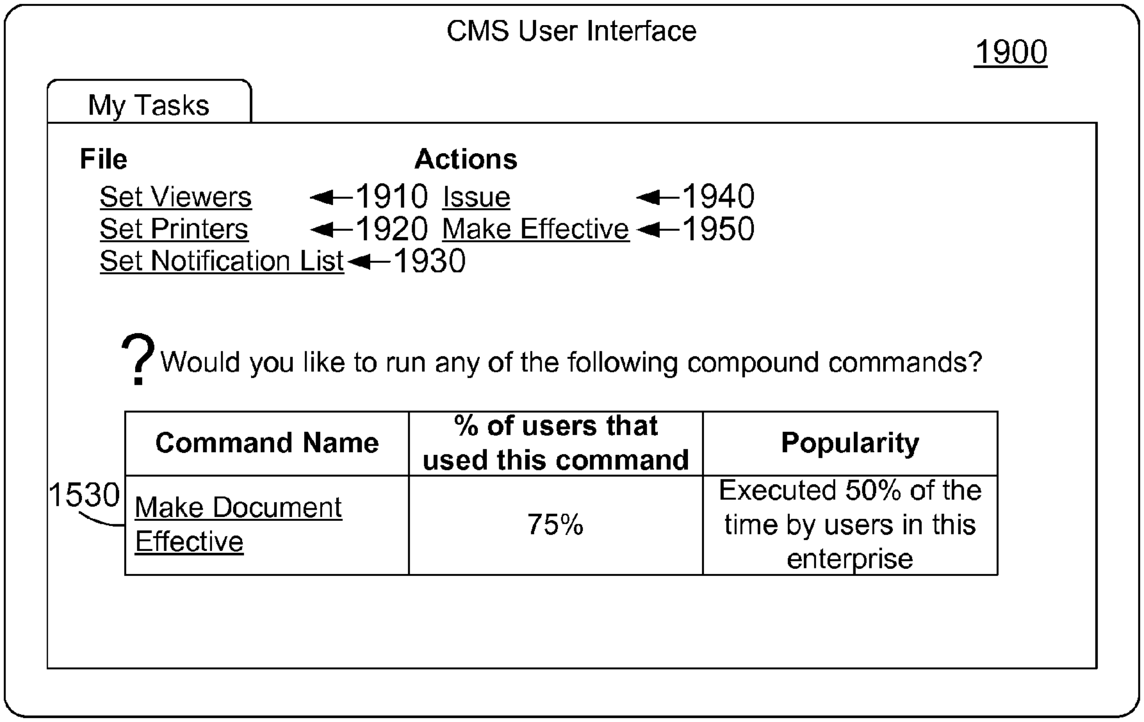
FIG. 19 shows a user interface for a second user in a second workplace for an example herein.

FIG. 19 shows a user interface 1900 for user Nancy in the example herein. In user interface 1900, user Nancy is operating in the "My Tasks" context which includes simple commands 1910-1950. Simple commands 1910-1950 are always displayed to the user (step 810 in FIG. 8). Since compound command 1530 has a scope of "enterprise" (step 830=YES in FIG. 8), compound command 1530 is displayed on user interface 1900 (step 840 in FIG. 8). Compound command 1530 is available to user Nancy even though she has not personally performed command sequence 1430. Compound command 1530 contains a "% of users who have run this command" field and a "Popularity" field. The "% of users who have run this command" field shows the percentage of users that have run the command. The "Popularity" field shows how often the users in the system have executed each the compound command.

FIG. 20 shows sample command sequence occurrence data 2000, similar to 1400 in FIG. 14, and illustrates a compound command may include one or more other compound commands. Thus, compound command 2010 includes a single command View XML Document performed by Joe at 1305 in FIG. 13, followed by a compound command "Make Changes and Send for Review" 1410 in FIG. 14 and 1510 in FIG. 15. While this sequence is shown only once in the sample data in FIG. 13, we assume for this example Joe has performed the sequence in FIG. 13 five times, which triggers the creation of a compound command 2110 representing the sequence, as illustrated in FIG. 21.

Many commands include parameters that the user specifies to accomplish a desired function. The disclosure and claims herein expressly extend to any suitable way to specify parameters for commands. For example, when a compound command is executed, the user could be prompted to provide the needed parameters for one or more of the commands that make up the compound command. In the alternative, the last parameters used when the compound command was executed by the user could be used. In another variation, the last parameters used when the compound command was executed by the user could be populated in the commands, and the user could then be prompted to change any of these parameters as needed. In yet another variation, the last parameters used when the compound command was executed by the user could be automatically changed according to the user's current context. In addition, the output of one command could be automatically provided as a parameter to a subsequent command in the compound command. All of these listed above, and other methods not specifically disclosed herein for specifying parameters for one or more commands in a compound command, are within the scope of the disclosure and claims herein.

While the disclosure and claims herein are discussed in terms of a content management system, the disclosure and claims apply equally to computer systems outside the CMS environment. The concepts discussed herein could apply equally to any application or operating system. For example, suppose a user wants to perform the task of logging into his online banking website to make a payment. Every time the user wants to perform this task the user must launch his internet browser, browse to the banking website, enter his security information, and then select the account the payment should be made from. As the user performs these commands, compound command generation mechanism could recognize this as a command sequence, and a compound command could be generated for "Log into bank account" which would perform the commands above. Another useful implementation would be in a word processing environment where macros are known in the art. A word processing program could monitor a user's actions and then automatically create or suggest a macro to perform the repetitive steps taken in the word processing program. One skilled in the art will appreciate that the concepts described herein are not limited to a single operating environment, but extend to any suitable computer system and operating environment where a user could perform sequences of commands repetitively.

While the disclosure and claims herein discuss determining a command sequence on the fly, user command log 173 allows compound command generation mechanism 172 to analyze user command log 173 retroactively to determine if any command sequences that satisfy command sequence identification policy 174 exist. Compound command generation mechanism 172 could analyze user command log 173 on the fly, periodically, or when an administrator prompts compound command generation mechanism 172 to analyze user command log 173. Thus the disclosure and claims herein extend to any way for a user's commands to be analyzed to determine if any command sequences exist.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

The invention claimed is:

1. A computer-implemented method for automatically generating a compound command from a user as the user performs commands, the method comprising the steps of:

(A) providing at least one processor;

(B) providing a memory coupled to the at least one processor;

(C) defining a command identification policy that specifies completion criteria that determines when a command sequence is completed;

(D) defining a compound command policy that specifies a threshold number of times comprising a plurality of times the command sequence must have occurred for automatic generation of a compound command from the command sequence;

(E) the user performs a command;

(F) adding the command to the command sequence;

(G) performing steps (E)-(F) until the completion criteria in the command sequence identification policy is satisfied; and (H) when the command sequence satisfies the threshold in the compound command policy, automatically generating the compound command from the command sequence.

2. The method of claim 1 wherein the compound command automatically executes all commands in the command sequence.

3. The method of claim 1 wherein the command sequence comprises a plurality of simple commands.

4. The method of claim 1 wherein the command sequence comprises at least one simple command and at least one compound command.

5. The method of claim 1 further comprising the step of making the compound command available to a user only when the user satisfies the compound command policy.

6. The method of claim 1 further comprising the step of logging the command in a user command log.

* * * * *